Patented May 24, 1949

2,471,265

UNITED STATES PATENT OFFICE 2,471,265

PARASITICIDAL COMPOSITIONS COMPRISING ALKYL-HALO-NAPHTHALENES

Robert R. Dreisbach and Fred W. Fletcher, Midland, Mich., assignors to The Dow Chemical Company, Midland, Mich., a corporation of Delaware No Drawing. Application January 29, 1942,
Serial No. 428,756

1 Claim. (Cl. 167—24)

The present invention is directed to new parasiticidal compositions comprising as an active toxicant an alkyl-halo-naphthalene.

Naphthalene has been widely publicized as a fumigant, moth repellant, and insecticidal toxicant. This compound is a crystalline solid melting at 80° C. and having a pungent and objectionable odor. Wearing apparel, food, and other materials of organic nature contacted with naphthalene or its vapors absorb the odor of the compound to an undesirable degree. Furthermore, by reason of its volatile and crystalline nature naphthalene does not afford extended protection to surfaces on which it is deposited but is soon dissipated by vaporizing or dusting.

Similarly, the halo-naphthalenes have been suggested as insecticidal and fungicidal agents. These products have a strong characteristic odor, and, in the amounts required for control of many parasites, are both irritating and injurious to humans and to plant growth.

According to the present invention, it has been discovered that alkyl-halo-naphthalenes are much more effective toxicants than either naphthalene or the halo-naphthalenes and to be materially less injurious to plant foliage. In combination with inert diluents and carriers or in mixture with known parasiticides, these new toxicants have been found effective against a large number of household and agricultural insect and mite pests, and frequently to have fungicidal properties. The alkyl-halo-naphthalenes may be employed in combination with pyrethrin- or rotenone-containing plant extracts and with synthetic organic toxicants to give compositions adapted to be diluted to form spray and dust products having synergistic properties as regards control of insect pests.

While the present invention is concerned with parasiticidal compositions comprising alkyl-halo-naphthalenes generally, a preferred embodiment of the invention resides in compositions comprising compounds of naphthalene nuclearly substituted by not more than two ethyl or propyl radicals and not more than two chlorine or bromine radicals. The preferred group of compounds may be characterized by the following formula

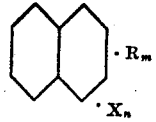

wherein X represents chlorine or bromine, R represents ethyl or propyl, and $m$ and $n$ each represent an integer not greater than 2.

The alkyl-halo-naphthalene compounds are preferably employed as mixtures of isomers in which form they are for the most part water-white liquids relatively insoluble in water and soluble in many organic solvents. These products are relatively high boiling and have a low volatility and a faint perfumelike odor. They may be used in combination with many known parasiticidal products and diluents without undergoing chemical change and also serve as solubilizers for such toxicants as rotenone, derris extract, phenols, etc.

In carrying out the invention the alkyl-halo-naphthalene product may be dissolved or otherwise dispersed in a non-corrosive organic solvent or water or mixed with a finely divided solid diluent to form parasiticidal concentrates, sprays, dips, or dusts. If desired, wetting agents, dispersing agents, or the like may be incorporated into the composition.

Among the wetting and dispersing agents which are compatible in the compositions of the present invention are bentonite, blood albumen, soaps, metal naphthenates, metal caseinates, long chain aliphatic acids and alcohols and their salts and esters, aryloxy alcohols, certain phenols, sulphonated alcohols and phenols and their salts, sulphonated aromatic hydrocarbons, etc.

Insecticidal and fungicidal toxicants adapted to be incorporated with alkyl-halo-naphthalene-containing compositions include derris, pyrethrins, hydroxy-alkyl ethers of phenols, halo-alkoxy-alkyl ethers of phenols, nicotine sulphate, organic thiocyanates, polychloro-phenols, nitro-phenols, complex amine structures, sulphur, cryolite, lime sulphur, lead arsenate, copper sprays and dusts, etc. Similarly pine oil, high boiling white petroleum oil, light lubricating oil, peanut oil, soya bean oil, castor oil, and codliver oil may be employed as supplemental parasiticides or carriers.

In the preparation of solutions or dispersions of the alkyl-halo-naphthalenes, water, ethanol, methanol, propanol, butanol, acetone, methyl-ethyl ketone, benzene, chlorobenzene, toluene, xylene, ethylene chloride, carbon tetrachloride, kerosene, and the like, or mixtures of two or more of such liquids may be employed as carriers. Suitable finely divided diluents for preparation of dusts and dust concentrates include wood flour, volcanic ash, pyrophyllite, bentonite, diatomaceous earth, calcium carbonate, lime, calcium sulphate, gypsum, tri-calcium phosphate, carbon, etc.

Any suitable amounts of the alkyl-halo-naphthalenes may be employed in the new compositions, the exact proportions varying with the particular pest to be controlled, the physical nature of the ultimate composition desired, the presence or absence of supplementary toxicants in the compositions, and the particular alkyl-halo-naphthalene concerned. In the preparation of concentrates, from about 10 to 95 parts by weight of the alkyl-halo-naphthalene may be mixed with sufficient wetting or dispersing agents to form 100 pars of a product adapted to be diluted to form either spray or dust compositions. Dilute spray compositions, whether in the form of solutions, emulsions, or suspensions, may contain from 0.001 per cent to approximately 20 per cent by weight of the alkyl-halo-naphthalene. Dust compositions preferably run from 1 to 10 per cent by weight of toxicant if they are to be applied directly for insect control. Where the dust is to be subsequently dispersed in a liquid carrier or modified with additional finely divided solid carriers, as much as 90 per cent of active toxicant may be employed.

The alkyl-halo-naphthalenes employed as insecticidal toxicants in the compositions with which the present invention is concerned may be prepared by the direct halogenation of alkyl-naphthalenes. This is conveniently accomplished by passing gaseous or liquid halogen into the liquid alkyl-naphthalene in the presence of a suitable catalyst such as iron filings, etc. The temperature of the reaction mixture is preferably maintained at below 25° C. although somewhat higher temperatures may be employed if desired. In certain instances a reaction solvent may be employed whereby the control of operating temperatures is facilitated. The amount of halogen passed into the alkyl-naphthalene or solution thereof in reaction solvent is dependent upon the degree of halogenation desired. Thus chlorine or bromine may be introduced into the alkyl-naphthalene reaction mixture until one or several molecular equivalents have been reacted as indicated by the increase of weight of the mixture or the amount of hydrogen halide evolved. When the halogen addition is complete, the crude mixture is filtered and washed with water or dilute aqueous alkali to remove iron catalyst and dissolved hydrogen halide and thereafter fractionally distilled to obtain the desired alkyl-halo-naphthalene or mixed alkyl-halo-naphthalene product. The following preparation of ethyl-bromo-naphthalenes is illustrative:

500 grams of ethyl naphthalene (boiling at 139°–143° C. at 25 m. m. pressure) and 5 grams of iron filings were mixed together and 410 grams of bromine added portionwise thereto over a period of 2.4 hours at a temperature of 17°–20° C. After all of the bromine had been added, the reaction product was stirred for an additional 2 hours and thereafter filtered and washed with dilute aqueous sodium hydroxide. The product was then distilled under reduced pressure to obtain 298 grams of an ethyl-monobromo-naphthalene fraction boiling at 181°–184° C. at 25 m. m. pressure and 47 grams of an ethyl-dibromo-naphthalene fraction boiling at 221°–223° C. at 25 m. m. pressure. Intermediate fractions obtained in the distillation consist of mixture of the mono- and di-bromo products. Higher boiling fractions comprised tri- and tetra-bromo-ethyl-naphthalene derivatives.

The following examples illustrate the invention, but are not to be construed as limiting.

EXAMPLE 1

A number of alkyl-halo-naphthalene compounds and fractions were employed as solutions in a light petroleum distillate approximating kerosene for the control of household pests such as flies, mosquitoes, roaches, carpet beetles, etc. The following table sets forth representative results obtained with spray compositions comprising in each instance 8.88 grams of the alkyl-halo-naphthalene in 100 milliliters of the solvent. These determinations were carried out against 5 day old houseflies substantially in accordance with the well known Peet-Grady procedure.

| Toxicant | Boiling Temperature | Percent Knockdown in 10 Mins. | Percent Kill in 25 Hrs. |
| --- | --- | --- | --- |
| Ethyl-Monochloro-Naphthalene | 154°–158° C. at 27 mm. pressure | 92.8 | 42.5 |
| Diethyl-Monochloro-Naphthalene | 148° C. at 5 mm. pressure | 79.6 | 30.8 |
| Do | 146°–156° C. at 4 mm. pressure | 77.7 | 43.5 |
| Isopropyl-Monochloro-Naphthalene | 176° C. at 25 mm. pressure | 94.3 | 60.1 |
| Do | 183°–184° C. at 25 mm. pressure | 89.9 | 49.4 |
| Ethyl-Monobromo-Naphthalene | 181°–184° C. at 25 mm. pressure | 97.7 | 62.5 |
| Ethyl-Dibromo-Naphthalene | 221°–223° C. at 25 mm. pressure | 77.7 | 54.8 |

EXAMPLE 2

A solution of 50 milligrams of pyrethrins in 100 milliliters of petroleum distillate, when tested according to the Peet-Grady procedure, gave a knockdown of 99 per cent in 10 minutes and a kill of 20 per cent in 24 hours. When this composition was modified with 8.88 grams of diethyl-monochloro-naphthalene (boiling at 148° C. at 5 m. m. pressure) a composition was obtained which gave a knockdown of 99.7 per cent in 10 minutes and a kill of 55.7 in 24 hours.

A similar composition in which the diethyl-monochloro-naphthalene fraction boiling at 146°–156° C. at 4 m. m. pressure was employed, gave a knockdown of 100 per cent in 10 minutes and a kill of 80.4 per cent in 24 hours. A composition in which isopropyl-monochloro-naphthalene boiling at 183°–184° C. at 25 m. m. pressure was substituted for the diethyl-monochloro-naphthalene gave a knockdown of 99.8 per cent in 10 minutes and a kill of 73.2 per cent in 24 hours.

EXAMPLE 3

70 parts by weight of isopropyl-monochloro-naphthalene boiling at 176° C. at 25 m. m. pressure, 20 parts by weight of white paraffin oil, and 20 parts by weight of a wetting and dispersing agent consisting of a condensation product of ethylene oxide and an organic acid (sold as "Emulphor EL") may be mixed together to form a concentrate. When sufficient of this product is dispersed in water to give a concentration of 4 pounds of the alkyl-halo-naphthalene per 100 gallons of ultimate spray composition, the resulting spray mixture is adapted to be employed for the control of red spider, adult and young.

EXAMPLE 4

19.5 parts by weight of ethyl-monobromo-naphthalene boiling at 181°–184° C., at 25 m. m. pressure, 78.1 parts of diatomaceous earth, and 2.4 parts of sodium lauryl sulphate are ground together to form a dust mixture adapted to be employed in the preparation of aqueous sprays. When dispersed in sufficient water to give a toxicant concentration of from 2 to 4 pounds per 100 gallons, this mixture is very effective against the poplar aphis.

EXAMPLE 5

2.5 parts by weight of diethyl-monochloro-naphthalene boiling at 146°–156° C. at 4 m. m. pressure, 1 part of ground derris root containing 5 per cent of rotenone, and 96.5 per cent of pyrophyllite are ground together to obtain a dust product adapted to be applied without further modification for the control of plant parasites, such as pea aphis.

Similarly, other alkyl-halo-naphthalene compounds may be employed instead of those set forth in the foregoing examples. Representative of such compounds are dimethyl dibromo-naphthalene, secondary-butyl - monocloro - naphthalene, tetraethyl-dichloro-naphthalene, tri-isopropyl - monochloro - naphthalene, amyl-trichloronaphthalene, octyl-monobromo-naphthalene, etc.

We claim:

An insecticidal composition comprising an alkyl-halo-naphthalene and pyrethrin as active toxicants.

ROBERT R. DREISBACH.
FRED W. FLETCHER.

REFERENCES CITED

The following references are of record in the file of this patent:

UNITED STATES PATENTS

| Number | Name | Date |
|---|---|---|
| 1,613,402 | Maxwell-Lefray | Jan. 4, 1927 |
| 2,243,543 | Ter Horst | May 27, 1941 |

FOREIGN PATENTS

| Number | Country | Date |
|---|---|---|
| 126,716 | Switzerland | July 2, 1928 |
| 263,844 | Great Britain | May 12, 1927 |

OTHER REFERENCES

Chemical Abstracts, volume 24, page 3248.